UNITED STATES PATENT OFFICE 2,454,808

REAGENT AND PROCESS FOR RESOLVING EMULSIONS

Willard H. Kirkpatrick and Doyne L. Wilson, Sugar Land, Tex., assignors to Visco Products Company, Houston, Tex., a corporation of Delaware No Drawing. Application February 23, 1946, Serial No. 649,744

8 Claims. (Cl. 252—342)

This invention relates in particular to the treatment of emulsions of mineral oil and water, such as petroleum emulsions commonly encountered in the production, handling and refining of crude mineral oil, for the purpose of separating the oil from the water. Also the invention relates to the treatment of other water-in-oil type of emulsions wherein the emulsions are producer artificially or naturally and the resolution of the emulsions presents a problem of recovery or disposal.

Petroleum emulsions are in general of the water-in-oil type wherein the oil acts as a continuous phase for the dispersal of finely divided particles of naturally occurring waters or brines. These emulsions are often extremely stable and will not resolve on long standing. It is to be understood that water-in-oil emulsions may occur artificially resulting from any one or more of numerous operations encountered in various industries. The emulsions obtained from producing wells and from the bottom of crude oil storage tanks are commonly referred to as "cut oil," "emulsified oil," "bottom settlings," and "B. S."

One object of our invention is to provide a novel and economical process for resolving emulsions of the character referred to into their component parts of oil and water or brine.

Another object is to provide a novel reagent which is water-wettable, interfacial and surface-active in order to enable its use as a demulsifier or for such uses where surface-active characteristics are necessary or desirable.

This process involves subjecting an emulsion of the water-in-oil type to the action of a demulsifying agent of the kind hereinafter described, thereby causing the emulsion to resolve and stratify into its component parts of oil and water or brine after the emulsion has been allowed to stand in a relatively quiescent state.

The treating reagent employed in accordance with the present invention consists of a blown mixed ester of a polyhydric alcohol, preferably a polyalkylene glycol, of the kind obtained when a polyhydroxy organic compound, e. g., a polyalkylene glycol or derivative thereof, unites to form mixed type esters with two dissimilar carboxy acids, one being an unsaturated long chain acyclic type of carboxy acid containing at least 8 carbon atoms and the other being an unsaturated carbocyclic acidic resin type carboxy acid, for instance, abietic acid.

Polyalkylene glycols comprise a series of polymers having the general formula $$HOCH_2(C_nH_{2n}OC_nH_{2n})_xCH_2OH$$

wherein $n$ and $x$ are the same or different whole numbers. Polyethylene glycols are currently available in technical quantities and are offered in polymeric grades corresponding to molecular weights of 200, 300, 400, 600, 1000, 1500, 1540, 4000 and 6000. Up to a molecular weight of 600, the materials all are viscous, light colored, somewhat hygroscopic liquids of low vapor pressure and are characterized by complete solubility in water and in many organic solvents. Examples of the latter are aliphatic ketones and alcohols, glycol-ethers, aliphatic esters and aromatic hydrocarbons. Structurally, the polyethylene glycols are characterized by a large number of ether linkages and two terminal hydroxyl groups so that they are heat stable and inert to many chemical agents. The higher molecular weight polyethylene glycols are bland, odorless solids. The following are the physical properties of the two polyethylene glycols which are our preferred reactants:

Polyethylene glycols

|  | 300 | 400 |
|---|---|---|
| Average Molecular Weight | 285 to 315 | 380 to 420. |
| Freezing Range, degrees C | −15 to 8 | 4 to 10. |
| Specific Gravity 20/20 degrees C | 1.13 | 1.13. |
| Flash Point, degrees F | 385 | 435. |
| Saybolt Viscosity at 210 degrees F., sec. | 42 to 46 | 45 to 55. |
| Water Solubility at 20 degrees C., percent by Weight. | Complete | Complete. |
| Comparative Hygroscopicity (Glycerol=100). | 70 | 60. |

Simple glycols (e. g., ethylene glycol, propylene glycol), glycerine, polyglycerol and related di- or polyhydroxy compounds can also be employed for the purposes of this invention.

Of the two dissimilar carboxy acids required for esterification, the one is preferably an unsaturated long chain acyclic or fatty type carboxy acid having at least 8 carbon atoms and not more than 32 carbon atoms in the chain. This group of acids may also be called unsaturated detergent forming acids. As examples of acyclic type acids which we have found particularly suitable for our purposes we may mention: linolenic acid, linoleic acid, oleic acid, mixtures thereof, and other commonly available unsaturated long chain acyclic acids. Certain of these acids (e. g., linoleic acid and linolenic acid) may also be called drying oil acids. Especially good results have been obtained by the practice of the invention with blown esters derived from polyethylene glycols, and mixtures of drying oil and non-drying (e. g., oleic acid) oil fatty acids.

The other dissimilar type of carboxy acid required for our process is a carbocyclic carboxy acid of the terpene type, preferably a rosin acid. The most commonly available rosin acids are abietic acid and related derivatives derived from naval stores. Other acidic resins, e. g., polymerized rosin, dehydrogenated rosin and cracked copals (for example, run Congo) may be employed.

The dissimilarity of these two types of carboxy acids is characterized by the acyclic type being a long chain carboxy acid, whereas the rosin type is a carbocyclic carboxy acid of the terpene type.

While any blend of the dissimilar acids can be prepared, our preferred mixture of dissimilar carboxy acids is readily obtainable as a naturally occurring mixture of dissimilar carboxy acids known in the trade as tall oil. Tall oil is the liquid resin obtained in digesting wood to wood pulp in the paper industry. It is a dark brown, viscous liquid containing a crystalline sediment of abietic acid. From the results of several investigators the following principal constituents of tall oil are indicated: resin acids 30–45%, fatty acids 45–60%, unsaponifiable matter 6–12%. The unsaponifiable portion is a yellow viscous oil containing a waxy or pitchy material. The specifications of the particular grade of tall oil which we prefer to use is as follows:

| | |
|---|---|
| Specific gravity (at 15.5 degrees C.) | .9697 |
| Acid number | 164.0 |
| Saponification number | 173.6 |
| Ester number | 9.4 |
| Per cent moisture | 0.0 |
| Per cent rosin acids | 39.2 |
| Per cent fatty acids (by difference) | 52.79 |
| Per cent linolenic acid | 19.25 |
| Per cent linoleic acid | 10.5 |
| Per cent oleic acid | 23.04 |
| Unsaponifiable per cent | 8.01 |
| Iodine number | 148.83 |
| Thiocyanogen—Iodine number | 91.1 |
| Per cent saturated fatty acids | None |
| Per cent unsaturated fatty acids | 100 |
| Titer test degrees C | 5.5 |
| Pour test degrees C | 4.4 |
| Cloud test degrees C | 10–12.8 |

The preparation of the mixed dissimilar carboxy acid esters of polyalkylene glycols or their indicated equivalents is carried out in any of the well known conventional esterification procedures with or without catalysts. We prefer to carry out the esterification reaction by mixing the carboxy bodies and the polyhydroxy bodies in a suitable solvent which is adaptable to azeotropic distillation. It is to be noted that the use of a solvent is not essential but in some instances its use may facilitate the reaction. Likewise, the use of catalysts such as sulphuric acid and other acidic agents may facilitate the reaction.

It has long been known that various unsaturated materials can be blown or oxidized so as to yield materials which differ in chemical and physical properties and characteristics from the parent materials from which they were derived. The oxidation operation is generally conducted by means of relatively dry air. Oxygen, ozone, ozonized air or a mixture of the same may be used. The blowing process may be conducted at atmospheric pressure or may be conducted at increased pressures. Oxidation may be carried out with or without catalysts at relatively low temperatures or may be conducted at much higher temperatures. The period of blowing may vary from a relatively short time to as long as several days. During the blowing operations hydroxyl groups are introduced at the unsaturated linkages of the material being treated. One such explanation of the mode of reaction is that oxygen is first absorbed and thus saturates the ethylene linkages and this upon further reaction with water yields two hydroxyl groups.

In order to illustrate specifically the new types of materials contemplated for use in accordance with the present invention, the following examples are set forth below as being typical of products suitable for use. It is to be understood, however, that we do not confine ourselves to the specific chemicals, or proportions thereof, set forth in these examples as it will be obvious that equivalents of these chemicals and other proportions may be used without departing from the spirit of the invention or the scope of the appended claims.

*Example I*

Six hundred (600) grams of tall oil are heated with 400 grams of polyethylene glycol 400 and 5 cc. of 98% sulphuric acid to effect the loss of an aqueous distillate in the amount of 43 cc. which is equivalent to two mols of water of esterification plus the moisture contained in the above amount of tall oil. The following is a log of the distillation:

| Time | Temperature, °C. | Volume Aqueous Distillate |
|---|---|---|
| 10:10 a. m. | 130 | Began. |
| 11:20 a. m. | 153 | 20.0 cc. |
| 2:30 p. m. | 209 | 31.0 cc. |
| 4:40 p. m. | 242 | 36.0 cc. |
| 8:15 p. m. | 247 | 41.0 cc. |
| 10:20 p. m. | 251 | 43.0 cc. |

This product has an acid number of 14.3.

Nine hundred twenty-five (925) grams of the ester as prepared above was placed in a two liter, three-necked flask equipped with a stirrer, thermometer and inlet tube for air. The contents of the flask were heated to 205–215 degrees C. while a moderate stream of moist air was passed through the liquid for a period of 13 hours, at the end of which time it had reached the desired degree of reactivity as indicated by its appearance at room temperature as a soft viscous resin. Three hundred (300) grams of a suitable hydrocarbon was added to adjust the viscosity of the finished material which was brilliantly clear and colloidally dispersible in water. The product may be used as such or admixed with other materials as disclosed in later examples.

*Example II*

Eighteen hundred (1800) grams of tall oil, 200 grams of glycerine (technical grade), and 10 grams of sulphuric acid (98%) were heated to effect loss of an aqueous distillate equivalent to three mols of water of esterification plus the moisture contained in the tall oil and glycerine as shown in the following log of distillation:

| Time | Temperature, °C. | Volume Aqueous Distillate |
|---|---|---|
| 12:45 p. m. | 130 | Began. |
| 1:15 p. m. | 150 | 26.0 cc. |
| 2:15 p. m. | 189 | 62.0 cc. |
| 3:20 p. m. | 209 | 92.0 cc. |
| 5:15 p. m. | 240 | 128.0 cc. |

Twelve hundred (1200) grams of the above ester was placed in a two liter, three-necked flask equipped with stirrer, thermometer and inlet tube for air and a moderate stream of air was passed through the contents of the flask at 205–215 degrees C. during a period of 13 hours. At the end of this time the product had obtained the proper degree of reactivity as indicated by its appearance and viscosity. The product has the appearance of being thick and tacky but is short of the livery stage and is not spongy or rubbery. Three hundred (300) grams of a suitable hydrocarbon vehicle was added to adjust the viscosity.

The finished material had a dark brown color and was brilliantly clear and insoluble in water.

Example III

Three hundred (300) grams of tall oil, 150 grams of polyethylene glycol 300, 50 grams of a suitable hydrocarbon vehicle, and 5 cc. of sulphuric acid (98%) were heated to remove 22 cc. of an aqueous distillate over a temperature range of 134–239 degrees C. during eight hours.

This material was then blown with air in an apparatus similar to that described in Example I while heating at 200 degrees C. with stirring over a period of 10 hours.

One hundred fifty (150) grams of a suitable hydrocarbon vehicle and 70 grams of anhydrous isopropyl alcohol were added to reduce the viscosity.

Example IV

Two hundred fifty (250) grams of polyethylene glycol 600, 300 grams tall oil, 25 grams of a suitable hydrocarbon vehicle, and 2 grams of sulphuric acid (98%) were heated to effect loss of 14.4 cc. of an aqueous distillate over a temperature range of 149–214 degrees C. during seven hours.

This ester was then heated and blown in an apparatus as described above for a period of 16½ hours at 200 degrees C. The resultant product is thick and tacky but not spongy, rubbery or livery. One hundred (100) grams of a suitable hydrocarbon vehicle and 50 grams of isopropyl alcohol were added with stirring to reduce viscosity.

Example V

The same procedure as in Example I with the exception that for the 600 grams of tall oil there is substituted 240 grams of abietic acid, 120 grams of linolenic acid, 60 grams of linoleic acid and 140 grams of oleic acid.

The above examples are only a few of the many products which may be prepared according to the principles disclosed in the foregoing discussion. Various examples of the many products which answer the description herein made are contemplated; some may be oil soluble and others water soluble, and in many instances they may possess dual solubility to an appreciable extent. The suitability of any of the products for the breaking and resolving of any given emulsion can readily be determined by conventional procedures. The products may be used as such for resolving emulsions of the water-in-oil type or they may be admixed with other demulsifying reagents in varying ratios as required by the problem at hand.

The suitable hydrocarbon vehicle referred to in the examples is sulphur dioxide ($SO_2$) extract. This material is a by-product from the Edeleanu process of refining petroleum in which the undesirable fractions are removed by extraction with liquid sulphur dioxide. After removal of the sulphur dioxide a mixture of hydrocarbons, substantially aromatic in character, remains which is designated in the trade as $SO_2$ extract. Examples of other suitable hydrocarbon vehicles are toluene, xylene, gas oil, Diesel fuel, Bunker fuel and coal tar solvents. The above cited examples of solvents are adaptable to azeotropic distillation as would also be any other solvent which is immiscible with water, miscible with the reacting mass and has a boiling point or boiling range in excess of the boiling point of water.

The improved demulsifying reagents prepared in accordance with the present invention are preferably used in the proportion of one part of reagent to from 2,000 to 30,000 parts of emulsion either by adding the concentrated product directly to the emulsion or after diluting with a suitable vehicle in the customary manner.

Having thus described the invention, what we claim as new and desire to secure by Letters Patent of the United States is:

1. A process for breaking emulsions of the water-in-oil type comprising subjecting the emulsion to the action of a blown mixed ester of a polyhydric alcohol and a mixture of at least two dissimilar unsaturated carboxy acids wherein at least one of said acids is a carbocyclic resin acid and another of said acids is a fatty acid having at least 8 and not more than 32 carbon atoms in the chain, the total acids forming the lesser of said carboxy acids component being at least 30% by weight of the whole of said carboxy acids mixture, said ester being blown to a soft, viscous condition.

2. A process for breaking emulsions of the water-in-oil type which comprises subjecting the emulsion to the action of a blown mixed ester of a polyalkylene glycol and a mixture of at least two dissimilar unsaturated carboxy acids wherein at least one of said acids is a carbocyclic rosin acid and the remaining acids are a fatty acid having at least 8 and not more than 32 carbon atoms in the chain, the total acids forming the lesser of said carboxy acids component being at least 30% by weight of the whole of said carboxy acids mixture, said ester being blown to a soft, viscous condition.

3. A process for breaking emulsions of the water-in-oil type which comprises subjecting said emulsion to the action of a blown mixed ester of a polyethylene glycol and at least two dissimilar unsaturated carboxy acids wherein at least one of the acids is a carbocyclic rosin acid and another of said acids is a fatty acid having at least 8 and not more than 32 carbon atoms in the chain, the total acids forming the lesser of said carboxy acids component being at least 30% by weight of the whole of said carboxy acids mixture, said ester being blown to a soft, viscous condition.

4. A process for breaking emulsions of the water-in-oil type wherein the emulsion is subjected to the action of a blown mixed ester derived from the reaction of a polyhydric alcohol and tall oil, said ester being blown to a soft, viscous condition.

5. A process for breaking emulsions of the water-in-oil type wherein the emulsion is subjected to the action of a blown mixed ester derived from the reaction of a polyalkylene glycol and tall oil, said ester being blown to a soft, viscous condition.

6. A process for breaking emulsions of the water-in-oil type which comprises subjecting said emulsions to the action of a blown product of the esterification of a polyethylene glycol with at least one drying oil acid, an unsaturated non-drying fatty acid, and a carbocyclic unsaturated carboxy resin acid, the total quantities of the fatty acid being within the range of 45 to 60% by weight of the total acids esterified and the total quantity of the resin acid being within the range of 30 to 45% by weight of the total acids esterified.

7. A process of breaking emulsions of the water-in-oil type wherein the emulsion is subjected to the action of a blown mixed ester derived from the reaction of a polyethylene glycol and tall oil, said ester being blown to a soft, viscous condition.

8. A process for breaking water-in-oil emulsions which comprises subjecting the emulsion to the action of a blown mixed ester of a polyethylene glycol having a molecular weight within the range from 200 to 600 and a mixture of at least two dissimilar unsaturated carboxy acids wherein at least one of said acids is a carbocyclic rosin acid and the remaining said carboxy acids are fatty acids having at least 8 and not more than 32 carbon atoms in the chain, the total acids forming the lesser of said carboxy acids component being at least 30% by weight of the whole of said carboxy acids mixture, said ester being blown to a soft, viscous condition.

WILLARD H. KIRKPATRICK.
DOYNE L. WILSON.

REFERENCES CITED

The following references are of record in the file of this patent:

UNITED STATES PATENTS

| Number | Name | Date |
| --- | --- | --- |
| 1,938,532 | Patch | Dec. 5, 1933 |
| 2,000,717 | Roberts | May 7, 1935 |
| 2,126,368 | Colbeth | Aug. 9, 1938 |
| 2,214,784 | Wayne | Sept. 17, 1940 |
| 2,353,698 | De Groote et al. | July 18, 1944 |
| 2,301,966 | Salathiel | June 11, 1946 |

OTHER REFERENCES

Paint Manufacture, Jan. 1941, vol. XI, page 4, 2nd column, upper quarter 260–97.5.